(12) United States Patent
Shaheen

(10) Patent No.: US 8,295,246 B2
(45) Date of Patent: *Oct. 23, 2012

(54) METHOD AND SYSTEM FOR SUPPORTING AN EVOLVED UTRAN

(75) Inventor: Kamel M. Shaheen, King of Prussia, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/301,114

(22) Filed: Nov. 21, 2011

(65) Prior Publication Data

US 2012/0063391 A1    Mar. 15, 2012

Related U.S. Application Data

(63) Continuation of application No. 11/444,846, filed on May 31, 2006, now Pat. No. 8,064,400.

(60) Provisional application No. 60/700,799, filed on Jul. 20, 2005.

(51) Int. Cl.
*H04W 4/00* (2009.01)
*H04W 4/02* (2009.01)
*H04W 36/00* (2009.01)

(52) U.S. Cl. .................................. 370/331; 455/436

(58) Field of Classification Search .................. 370/310, 370/331

See application file for complete search history.

(56) References Cited

U.S. PATENT DOCUMENTS

| | | |
|---|---|---|
| 6,950,655 B2 | 9/2005 | Hunkeler |
| 2002/0071404 A1 | 6/2002 | Park et al. |
| 2003/0013443 A1 | 1/2003 | Willars et al. |
| 2004/0058679 A1 | 3/2004 | Dillinger et al. |
| 2004/0114615 A1 | 6/2004 | Virtanen et al. |
| 2004/0147262 A1 | 7/2004 | Lescuyer et al. |
| 2005/0020297 A1 | 1/2005 | Axness et al. |

(Continued)

FOREIGN PATENT DOCUMENTS

EP    1 257 141    11/2002

(Continued)

OTHER PUBLICATIONS

3GPP, *Universal Mobile Telecommunications System (UMTS); Radio Resource Control (RRC) Protocol Specification (3GPP TS 25.331 version 7.0.0 Release 7)*, ETSI TS 125 331 V7.0.0 (Mar. 2006).

(Continued)

*Primary Examiner* — Jean Gelin
*Assistant Examiner* — Tangela T. Chambers
(74) *Attorney, Agent, or Firm* — Volpe and Koenig, P.C.

(57) ABSTRACT

A method and system for supporting an evolved universal mobile telecommunication systems (UMTS) terrestrial radio access network (E-UTRAN) are disclosed. The system includes a wireless transmit/receive unit (WTRU), a UTRAN and an E-UTRAN. The UTRAN sends to the WTRU a list of available radio access technologies in a coverage area of the UTRAN. The list includes information related to the E-UTRAN. The WTRU receives the list and may initiate a handoff based on the list. The WTRU then sends its multi-mode/multi-RAT capability information including the E-UTRAN capability to the UTRAN. The UTRAN then sends a measurement capability message to the WTRU. The measurement capability message includes parameters necessary for performing measurements on an E-UTRAN channel. The WTRU performs measurements based on the measurement capability message and reports measurement results to the UTRAN. The UTRAN may initiate a handoff to the E-UTRAN based on the measurement results.

6 Claims, 3 Drawing Sheets

U.S. PATENT DOCUMENTS

| | | | |
|---|---|---|---|
| 2005/0026616 | A1 | 2/2005 | Cavalli et al. |
| 2005/0073977 | A1 | 4/2005 | Vanghi et al. |
| 2005/0113023 | A1 | 5/2005 | Bassompierre et al. |
| 2005/0250499 | A1* | 11/2005 | Lee et al. ............... 455/436 |
| 2006/0172738 | A1* | 8/2006 | Kwon et al. ............ 455/436 |
| 2006/0223534 | A1 | 10/2006 | Newberg et al. |
| 2006/0250940 | A1 | 11/2006 | Tirkkonen et al. |
| 2006/0264217 | A1 | 11/2006 | Shaheen |
| 2007/0021120 | A1 | 1/2007 | Fiore et al. |
| 2007/0081492 | A1 | 4/2007 | Petrovic et al. |
| 2007/0155388 | A1 | 7/2007 | Petrovic et al. |
| 2007/0189282 | A1 | 8/2007 | Lohr et al. |
| 2008/0268852 | A1 | 10/2008 | Petrovic et al. |
| 2009/0156215 | A1* | 6/2009 | Pitkamaki ............... 455/436 |

FOREIGN PATENT DOCUMENTS

GB  2 352 586  1/2001

OTHER PUBLICATIONS

Alcatel et al., "Principles for the Evolved UTRA radio-access concept," TSG-RAN WG1 Ad Hoc on LTE, R1-050622 (Jun. 20-21, 2005).

NEC, "NEC's view on RAN2 main issues for E-UTRAN," TSG-RAN Working Group 2 LTE Adhoc Meeting, R2-051745 (Jun. 2005).

NTT Docomo et al., "Proposed Study Item on Evolved UTRA and UTRAN," TSG-RAN Meeting #26, RP-040461 (Dec. 8-10, 2004).

Third Generation Partnership Project, "Technical Specification Group Radio Access Network; Requirements for Evolved UTRA (E-UTRA) and Evolved UTRAN (E-UTRAN) (Release 7)," 3GPP TR 25.913 V7.0.0 (Jun. 2005).

Third Generation Partnership Project, "Technical Specification Group Radio Access Network; Requirements for Evolved UTRA (E-UTRA) and Evolved UTRAN (E-UTRAN) (Release 7)," 3GPP TR 25.913 V7.3.0 (Mar. 2006).

Third Generation Partnership Project, "Technical Specification Group Radio Access Network; Requirements for Evolved UTRA (E-UTRA) and Evolved UTRAN (E-UTRAN) (Release 7)," 3GPP TR 25.913 V2.1.0 (May 2005).

Third Generation Partnership Project, "Technical Specification Group Radio Access Network; Radio Resource Control (RRC); Protocol Specification (Release 4)," 3GPP TS 25.331 V4.17.0 (Mar. 2005).

Third Generation Partnership Project, "Technical Specification Group Radio Access Network; Radio Resource Control (RRC); Protocol Specification (Release 5)," 3GPP TS 25.331 V5.13.0 (Jun. 2005).

Third Generation Partnership Project, "Technical Specification Group Radio Access Network; Radio Resource Control (RRC); Protocol Specification (Release 5)," 3GPP TS 25.331 V5.16.0 (Mar. 2006).

Third Generation Partnership Project, "Technical Specification Group Radio Access Network; Radio Resource Control (RRC);Protocol Specification (Release 6)," 3GPP TS 25.331 V6.6.0 (Jun. 2005).

Third Generation Partnership Project, "Technical Specification Group Radio Access Network; Radio Resource Control (RRC); Protocol Specification (Release 6)," 3GPP TS 25.331 V6.9.0 (Mar. 2006).

Vodafone, "Interruption time performance at inter-RAT change for architecture B2," 3GPP TSG-SA WG2 #47, SRJ050090 (Jun. 2005).

* cited by examiner

METHOD AND SYSTEM FOR SUPPORTING AN EVOLVED UTRAN

CROSS REFERENCE TO RELATED APPLICATION

This application is a continuation of U.S. patent application Ser. No. 11/444,846, filed May 31, 2006, which claims the benefit of U.S. Provisional Application No. 60/700,799, filed Jul. 20, 2005. The contents of the above-referenced applications are incorporated by reference herein.

FIELD OF INVENTION

The present invention is related to wireless communication systems. More particularly, the present invention is related to a method and system for supporting an evolved universal mobile telecommunication systems (UMTS) terrestrial radio access network (E-UTRAN).

BACKGROUND

Different types of wireless access systems have been developed to provide different types of services and capabilities. Some examples of wireless access systems include wireless local area networks (WLANs), (such as IEEE 802-based networks), and cellular networks, (such as UMTS terrestrial radio access network (UTRAN), a global system for mobile communication (GSM)/enhanced data rate for GSM evolution (EDGE) radio access network (GERAN), or the like). Each of these networks have been developed and tailored to provide specific applications.

Proposals for an E-UTRAN (Long Term Evolution for UTRAN and evolved Node-B (E-Node-B)) have been made to improve wireless system capacity and enhance performance. The E-UTRAN will provide significant advantages over existing wireless communication systems and additional services may be available through the higher bit rate and lower latency provided by the E-UTRAN. FIG. 1 shows a conventional integrated wireless communication system 100 including an E-UTRAN 114. The system 100 includes an access system stratum 110, a network stratum 120 and a multimedia stratum 130. The access system stratum 110 includes a plurality of radio access networks (RANs) 111-115, a core network (CN) 116 and an evolved CN 117. The RANs 111-115 include a generic access network (GAN) 111, a GERAN 112, a UTRAN 113, an E-UTRAN 114 and an interworking wireless local area network (I-WLAN) 115. The RANs 111-115 are connected to the CN 116 or the evolved CN 117 to provide services, (such as multimedia services from an Internet protocol (IP) multimedia subsystem (IMS) 131), to one or more WTRUs while interacting with an authentication, authorization and accounting (AAA) server 121, a mobile IP (MIP) server 122, or other network entities in the network stratum 120 via a gateway general packet radio services (GPRS) support node (GGSN) 118 or a packet data gateway (PDG) 119.

Currently, multimode wireless transmit/receive units (WTRUs) configured to support multiple wireless communication systems are available. The capabilities of each of the WTRUs may vary. For example, some WTRUs may support only UMTS, while other WTRUs may support multiple mode of operations such as I-WLAN, GERAN, and/or E-UTRAN. The WTRUs that are capable of supporting E-UTRAN will also be available in the future.

Therefore, it would be desirable to provide a method and system for supporting an E-UTRAN such that the WTRUs may receive and utilize such additional E-UTRAN capabilities and services.

SUMMARY

The present invention is related to a method and system for supporting an E-UTRAN. The present invention extends conventional methods and procedures for supporting multimode operations within UMTS-based wireless communication system, (i.e., UTRAN), in order to support the addition of the new technology, (i.e., E-UTRAN), to the system. The conventional procedures are specified in third generation partnership project (3GPP) standards (e.g., TS25.331). The system, herein, includes a WTRU, a UTRAN and an E-UTRAN. A conventional UTRAN sends to the WTRU a list of available radio access technologies (RATs) in a coverage area of the UTRAN. The list includes information related to the existing RAT attributes such as technology type, bit rate, bandwidth, or the like. The present invention introduces the information related to E-UTRAN to this list. The WTRU receives this list during initial access or during handoff procedures. Upon receiving the list, an E-UTRAN capable WTRU may configure/reconfigure the WTRU to receive E-UTRAN services based on the list through handoff procedures or system reselection procedures. The E-URAN capable WTRU may send its multi-mode/multi-RAT capability information including the E-UTRAN capability to the UTRAN during the initial access, (i.e., attach procedures), or when requested by a system. During a normal handoff procedure, the UTRAN sends a measurement capability message to the WTRU. The measurement capability message includes parameters necessary for performing measurements on an E-UTRAN channel. The WTRU performs measurements based on the measurement capability message and reports measurement results to the UTRAN. The UTRAN may initiate a handoff to the E-UTRAN based on the measurement results. In idle operation, the WTRU may decide to re-select to the E-UTRAN based on the capability information received earlier from the UTRAN. The WTRU uses this information to configure the transmitter and receiver bandwidth, bit rate, frequency band, or the like.

BRIEF DESCRIPTION OF THE DRAWINGS

A more detailed understanding of the invention may be had from the following description of a preferred embodiment, given by way of example, and to be understood in conjunction with the accompanying drawings, wherein.

DETAILED DESCRIPTION OF THE PREFERRED EMBODIMENTS

When referred to hereafter, the terminology "WTRU" includes but is not limited to a user equipment, a mobile station, a fixed or mobile subscriber unit, a pager, or any other type of device capable of operating in a wireless environment.

The features of the present invention may be incorporated into an integrated circuit (IC) or be configured in a circuit comprising a multitude of interconnecting components.

Figure 1:
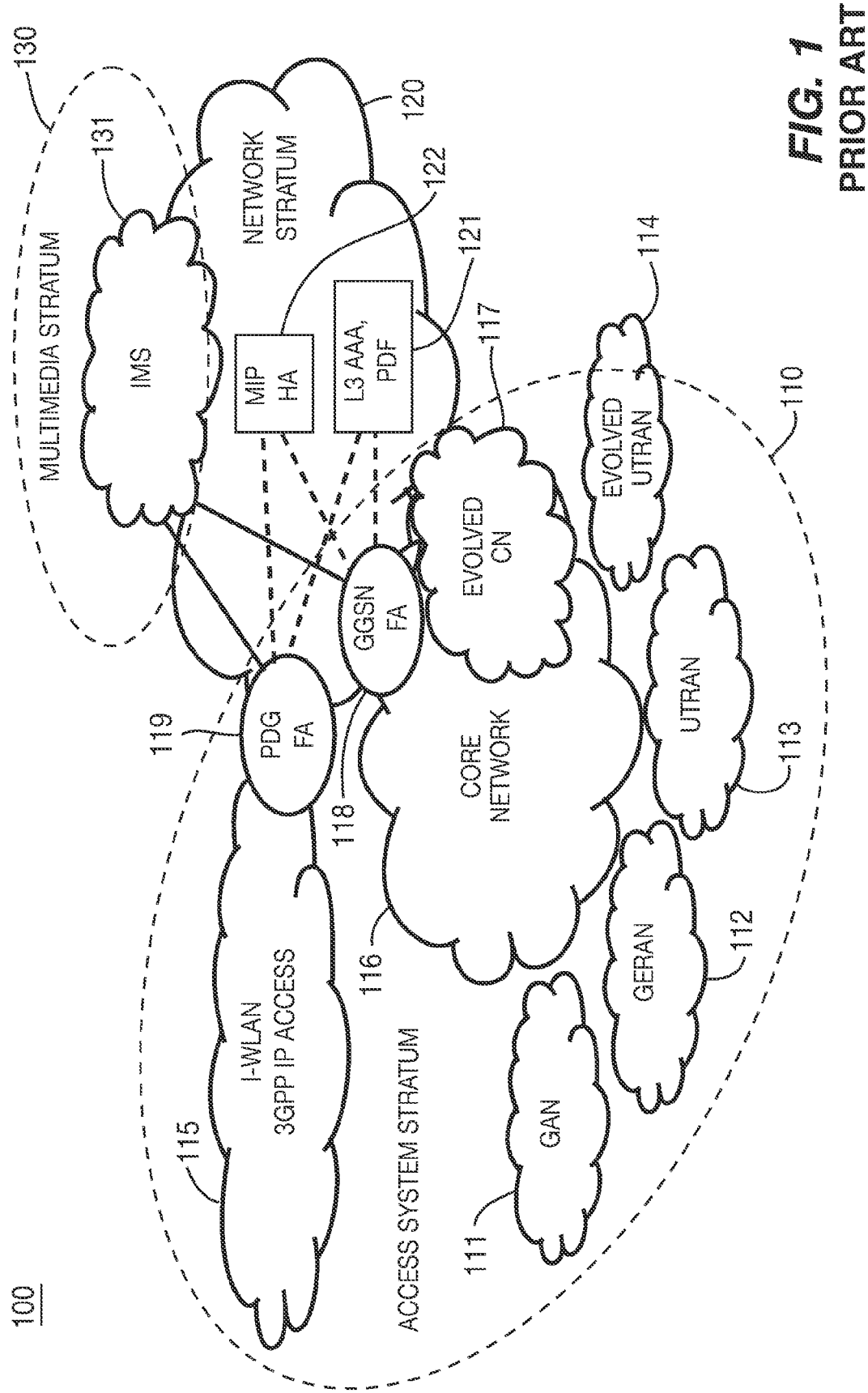
FIG. 1 is a diagram of a conventional wireless communication system.
Figure 2:
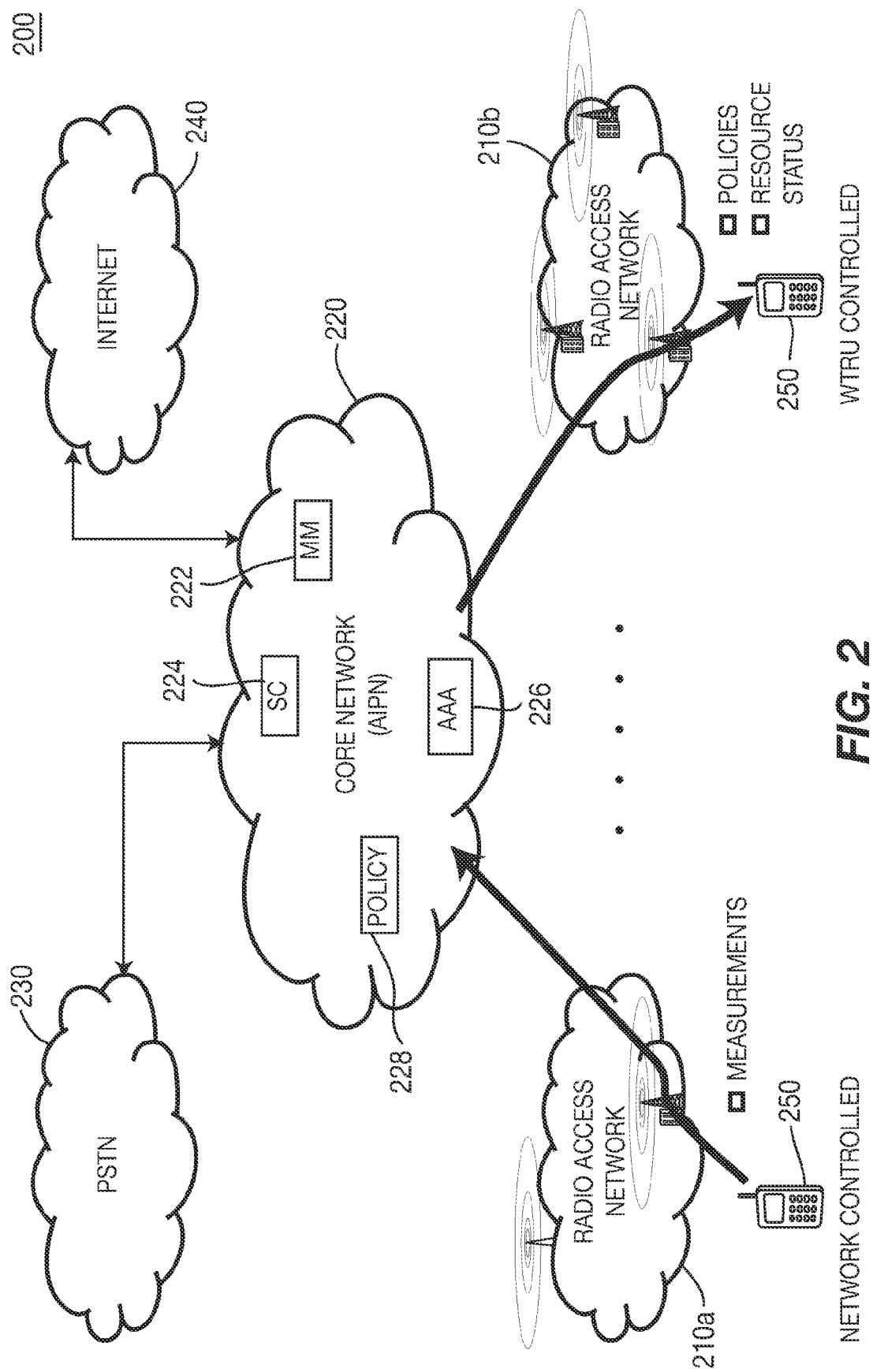
FIG. 2 shows a wireless communication system configured in accordance with the present invention.

FIG. 2 shows a wireless communication system 200 configured in accordance with the present invention. The system 200 includes a plurality of RANs 210a, 210b, deployed under different RATs, and a core network 220 which may be an all Internet protocol (IP) network (AIPN). The core network 220 is connected to other networks, such as a public switching telephone network (PSTN) 230, the Internet 240, or the like. Each of the RANs 210a, 210b may be a GAN, a GERAN, a UTRAN, an E-UTRAN, an IEEE-based I-WLAN, or any type of wireless access network.

In order to optimize mobility among diverse RANs 210a, 210b, the core network 220 provides open interfaces for mobility management (MM) 222 that allow the operator of the core network 220 to direct WTRUs 250 towards the most suitable RANs 210a, 210b. The core network 220 also provides open interfaces that allow the WTRUs 250 to access other AIPN services, such as session control (SC) 224, authentication, authorization and accounting (AAA) 226 and a policy control 228.

A WTRU 250 is a multi-mode WTRU equipped with at least two radio units configured to support communication with at least two different RATs. For example, the WTRU 250 may include one radio unit for communicating with an E-UTRAN and the other radio unit for communication with an I-WLAN. The WTRU 250 establishes a connection with one of the RANs and may perform a handoff to a target RAN if handoff criteria is met by the target RAN.

A handoff may be initiated manually or automatically in the system 200. In the manual handoff process initiated by a user of the WTRU 250, the user knows the existence of alternative RATs, (such as E-UTRAN), in its current geographic location and switches between them, (e.g., between the UTRAN and the E-UTRAN). The automatic handoff process may be initiated by the WTRU 250, or by the RAN 210a, 210b or the core network 220.

In the WTRU-initiated handoff, the WTRU 250 detects the existence of alternative RATs, (such as an E-UTRAN), and initiates a handoff process, (e.g., to the E-UTRAN), based on the preference of the user of the WTRU 250. The WTRU 250 receives necessary information, (such as handoff policies, resource status, or the like), from the network, (e.g., a RAN 210b or the core network 220). The WTRU 250 tracks the locations of coverage areas of the RANs 210a, 210b and initiates the handoff process based on predetermined handoff criteria.

In a system initiated handoff, the core network 220, (or the RAN 210a, 210b), recognizes that the WTRU 250 is capable of supporting multiple RATs, (including E-UTRAN), and requests necessary information, (such as power measurements), from the WTRU 250. The core network 220, (or the RAN 210a, 210b), tracks the location of the WTRU 250 and initiates the handoff procedures based on a set of criteria, (such as the mobility of the WTRU 250, requested bandwidth, applications, load balancing, subscriber's profile, the measurement reports provided by the WTRU 250, or the like), once the WTRU 250 is within the coverage area of a target RAN.

Figure 3:
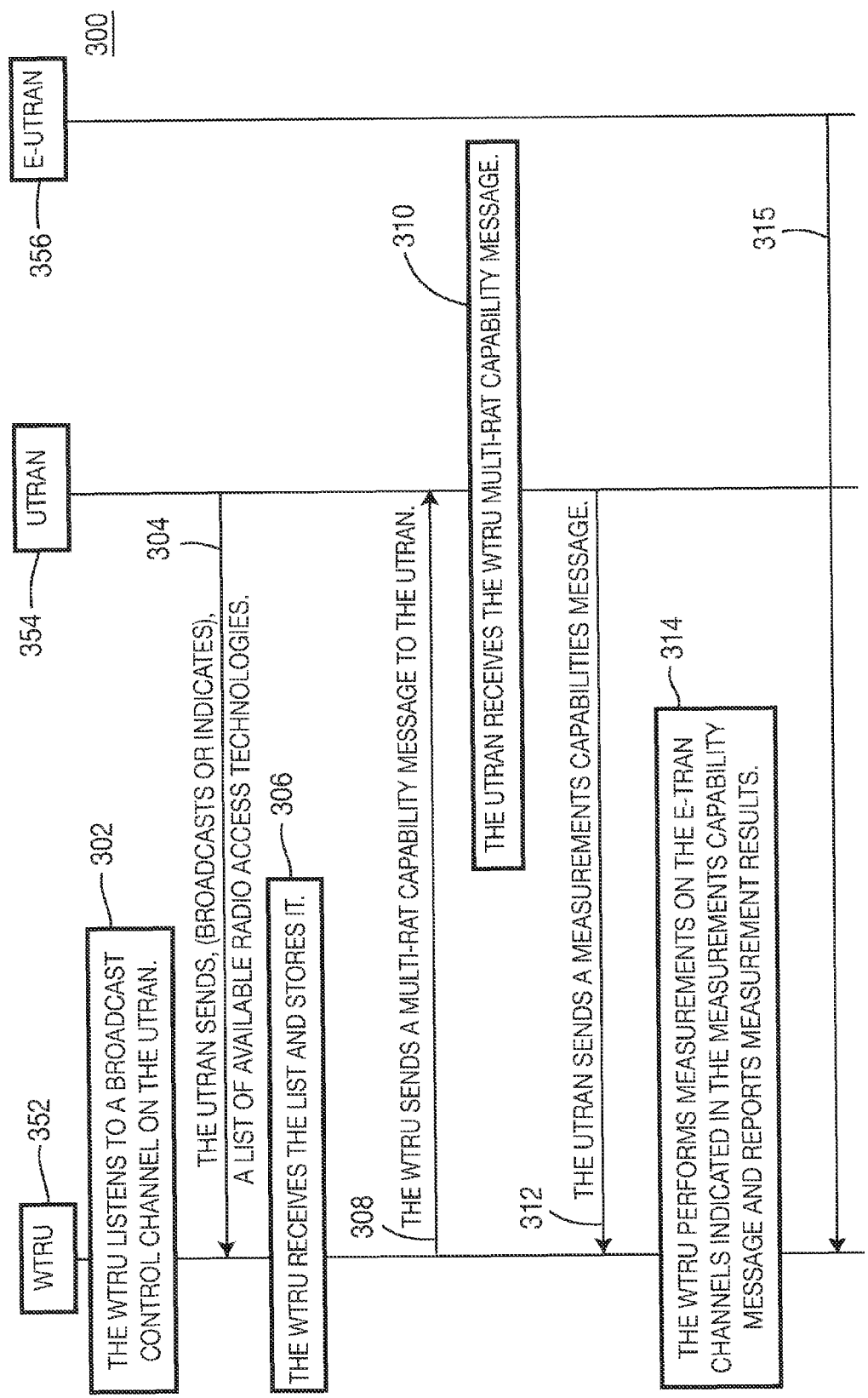
FIG. 3 is a flow diagram of a process for supporting E-UTRAN in accordance with the present invention.

FIG. 3 is a flow diagram of a process for supporting an E-UTRAN in accordance with the present invention. A WTRU 352 listens to a channel, (e.g., a broadcast control channel (BCCH)), on the UTRAN 354 (step 302). The UTRAN 354 sends, (or indicates), a list of available RATs, (such as E-UTRAN 356 RAT), within the coverage area of the UTRAN 354 to the WTRU 352 (step 304). The list of available RATs is preferably sent via a UTRAN cell information list message. However, the list may be sent via any type of messages.

The UTRAN cell information list message contains information on intra-frequency cells, inter-frequency cells and inter-RAT cells. The conventional UTRAN cell information list message is modified to include new information elements (IEs) for the E-UTRAN 356. The E-UTRAN 356 may be based on orthogonal frequency division multiplexing (OFDM), or any other type of air interface. In OFDM case, the UTRAN cell information list may include OFDM selection and reselection information, base transceiver station identity code (BSIC), system specific measurement information, or the like. The system specific measurement information enumerates supported frequencies, bandwidths, output power, or the like. Table 1 shows an exemplary UTRAN cell information list message including new IEs (shown in bold fonts) in accordance with the present invention.

TABLE 1

| Information Element/Group name | Need | Multi | Type and reference | Semantics description |
|---|---|---|---|---|
| Intra-frequency cell info | OP | 1 ... <maxCellMeas> | | |
| >CHOICE position status | MP | | | |
| >>Occupied | | | | |
| >>>Cell info | MP | | Cell info 10.3.7.2 | |
| >>Vacant | | | | No data |
| Inter-frequency cell info | OP | 1 ... <maxCellMeas> | | |
| >CHOICE position status | MP | | | |
| >>Occupied | | | | |
| >>>Frequency info | MP | | Frequency info 10.3.6.36 | |
| >>>Cell info | MP | | Cell info 10.3.7.2 | |
| >>Vacant | | | | No data |
| Inter-RAT cell info list | OP | | | |
| >Inter-RAT cell info | OP | 1 ... <maxCellMeas> | | |
| >>CHOICE position status | MP | | | |
| >>>Occupied | | | | |
| >>>>CHOICE Radio Access Technology | | | | |
| >>>>>GSM | | | | |

TABLE 1-continued

| Information Element/Group name | Need | Multi | Type and reference | Semantics description |
|---|---|---|---|---|
| >>>>>>Cell selection and re-selection info | MP | | Cell selection and re-selection info for SIB11/12 10.3.2.4 | |
| >>>>>>BSIC | MP | | BSIC 10.3.8.2 | |
| >>>>>>BCCH ARFCN | MP | | Integer (0 . . . 1023) | |
| >>>>>IS-2000 | | | | |
| >>>>>>System specific measurement info | | | enumerated (frequency, timeslot, colour code, output power, PN offset) | For IS-2000, use fields from TIA/EIA/IS-2000.5, subclause 3. 7.3.3.2.27, Candidate Frequency Neighbour List Message |
| >>>>>OFDM | | | | |
| >>>>>>OFDM selection and re-selection info | MP | | | |
| >>>>>>BSIC | MP | | | |
| >>>>>>System Specific measurement info | MP | | enumerated (frequency, bandwidth, output power) | |
| >>>Inter-RAT cell info indicator | OP | | Integer (0 . . . 3) | |
| >>Not present | | | | No data |

Referring again to FIG. 3, the WTRU 352 receives the list and stores it (step 306). Based on preset user preference, the WTRU 352 sends its multi-mode/multi-RAT capability information to the UTRAN 354 (step 308). The multi-mode/multi-RAT capability information indicates a support of E-UTRAN and/or other RATs. For example, the multi-mode/multi-RAT capability information may indicate a support of OFDM, a support of E-UTRAN to UTRAN handoff, OFDM radio frequency (RF) capability, OFDM measurement capability, or the like. The support of OFDM may enumerate the supported OFDM channel bandwidth, (e.g., 1.25 MHz, 2.5 MHz, 5 MHz, 10 MHz, 15 MHz, 20 MHz). The support of E-UTRAN to UTRAN handoff is preferably a Boolean value indicating such capability of the WTRU.

The OFDM RF capability and OFDM measurement capability indicate OFDM RF and measurement capabilities of the WTRU to the UTRAN. An OFDM channel may have different bandwidth depending of system configuration and the desired bit rate and delay associated with certain services. For example, in order to achieve the highest bit rate allowed, (e.g., 100 Mbps), the E-UTRAN must transmit and receive using the highest bandwidth allowed, (e.g. 20 MHz). The E-UTRAN may run several combinations of these services (different bandwidths for different WTRUs). Therefore, the handoff to the E-UTRAN should be triggered based on the OFDM RF capabilities of the WTRU. During handoff, when the WTRU performs measurements, the WTRU is preferably tuned and configured to a certain channel frequency and a specific bandwidth for the measurements. When the WTRU reports the measurements to the UTRAN, the UTRAN correlates the measurements with the physical attributes of the E-UTRAN channels. This guarantees that the handoff is done accurately to the correct target E-UTRAN channel that supports the desired bit rate and delay requirements.

The multi-mode/multi-RAT capability information may be sent via a conventional UTRAN WTRU multi-mode/multi-RAT capability message, WTRU radio access capability message, WTRU radio access capability extension message, or any other type of message. Tables 2-4 show an exemplary UTRAN WTRU multi-mode/multi-RAT capability message, a WTRU radio access capability message and a WTRU radio access capability extension message, respectively, including new IEs (shown in bold fonts) in accordance with the present invention.

TABLE 2

| Information Element/ Group name | Need | Multi | Type and Reference | Semantics description |
|---|---|---|---|---|
| Multi-RAT capability | | | | |
| Support of GSM | MP | | Boolean | |
| Support of multi-carrier | MP | | Boolean | |
| Multi-mode capability | MP | | Enumerated (TDD, FDD, FDD/TDD) | |
| Support of UTRAN to GERAN NACC | CV-not_iRAT_HoInfo | | Boolean | |
| Support OFDM | MP | | Enumerated (1.25M, 2.5M, 5M, 10M, 15M, 20 MHz, or range) | |
| Support E-UTRAN to UTRAN handoffs | | | Boolean | |

TABLE 3

| Information Element/Group name | Need | Multi | Type and reference | Semantics description |
|---|---|---|---|---|
| Access stratum release indicator | MP | | Enumerated (R99) | Indicates the release of the UE. The IE also indicates the release of the RRC transfer syntax supported by the UE.. |
| | CV-not_rrc_connectionSetupComplete | | Enumerated (REL-4, REL-5 REL-6) | 13 spare values are needed. |
| DL capability with simultaneous HS-DSCH configuration | OP | | Enumerated (32 kbps, 64 kbps, 128 kbps, 384 kbps) | |
| PDCP capability | MP | | PDCP capability 10.3.3.24 | |
| RLC capability | MP | | RLC capability 10.3.3.34 | |
| Transport channel capability | MP | | Transport channel capability 10.3.3.40 | |
| RF capability FDD | OP | | RF capability FDD 10.3.3.33 | |
| RF capability TDD | OP | | RF capability TDD 10.3.3.33b | One "TDD RF capability" entity shall be included for every Chip rate capability supported. |
| | | 1 to 2 | | |
| RF capability OFDM (E-UTRAN) | OP | | OFDM RF capability x.x.x | |
| Physical channel capability | MP | | Physical channel capability 10.3.3.25 | |
| UE multi-mode/multi-RAT capability | MP | | UE multi-mode/multi-RAT capability 10.3.3.41 | |
| Security capability | MP | | Security capability 10.3.3.37 | |
| UE positioning capability | MP | | UE positioning capability 10.3.3.45 | |
| Measurement capability | CH-fdd_req_sup | | Measurement capability 10.3.3.21 | |

TABLE 4

| Information Element/Group name | Need | Multi | Type and reference | Semantics description |
|---|---|---|---|---|
| Frequency band specific capability list | MP | 1 to <maxFreqbandsFDD> | | |
| >Frequency band | MP | | Enumerated (Band I, Band II, Band III, Band VI, Band IV, Band V, OFDM band) | One spare value is needed |
| >Frequency band 2 | OP | | Enumerated (Extension Indicator OFDM band) | This IE indicates the supported frequency bands beyond Band VIII (yet to be defined) Fifteen spare values are needed |
| >RF capability FDD extension | MD | | RF capability FDD extension 10.3.3.33a | the default values are the same values as in the immediately preceding IE "RF capability FDD extension"; the first occurrence is MP |
| >Measurement capability extension | MP | | Measurement capability extension 10.3.3.21a | |
| >RF capability OFDM | MD | | RF capability OFDM | |
| >Measurement capability OFDM | MP | | Measurement capability OFDM | |

Referring again to FIG. 3, the UTRAN 354 receives the WTRU multi-mode/multi-RAT capability message (step 310). The UTRAN 354 then sends a measurement capabilities message to the WTRU 352 (step 312). The measurement capability message defines the parameters necessary for the measurements. New IEs for the E-UTRAN are included in the conventional measurement capability message and the measurement capability extension message for the E-UTRAN parameters, (e.g., OFDM measurement parameters for each frequency bands). Each IE in the measurement capability message and the measurement capability extension message is a Boolean value indicating whether downlink or uplink compressed mode is required to perform measurements on each frequency band.

Tables 5 and 6 show an exemplary UTRAN measurement capability message and a measurement capability extension message, respectively. The new IEs introduced in accordance with the present invention are shown in bold font.

TABLE 5

| Information Element/Group name | Need | Multi | Type and reference | Semantics description |
|---|---|---|---|---|
| Need for downlink compressed mode | | | | |
| FDD measurements | MP | | Boolean | TRUE means that the UE requires DL compressed mode in order to perform measurements on FDD |
| 3.84 Mcps TDD measurements | CV-3.84_Mcps_tdd_sup | | Boolean | TRUE means that the UE requires DL compressed mode in order to perform measurements on 3.84 Mcps TDD |
| 1.28 Mcps TDD measurements | CV-1.28_Mcps_tdd_sup | | Boolean | TRUE means that the UE requires DL compressed mode in order to perform measurements on 1.28 Mcps TDD |
| GSM measurements | CV-gsm_sup | | | |
| >GSM 900 | MP | | Boolean | TRUE means that the UE requires DL compressed mode in order to perform measurements on GSM 900 |
| >DCS 1800 | MP | | Boolean | TRUE means that the UE requires DL compressed mode in order to perform measurements on DCS 1800 |
| >GSM 1900 | MP | | Boolean | TRUE means that the UE requires DL compressed mode in order to perform measurements on GSM 1900 |
| Multi-carrier measurement | CV-mc_sup | | Boolean | TRUE means that the UE requires DL compressed mode in order to perform measurements on multi-carrier |
| OFDM E-UTRAN measurements | | | | |
| >1.25 MHz | MP | | Boolean | TRUE means that the UE requires DL compressed mode in order to perform measurements on 1.25 MHz OFDM |
| >2.5 MHz | MP | | Boolean | TRUE means that the UE requires DL compressed mode in order to perform measurements on 2.5 MHz OFDM |
| >5 MHz | MP | | Boolean | TRUE means that the UE requires DL compressed mode in order to perform measurements on 5 MHz OFDM |
| >10 MHz | MP | | Boolean | TRUE means that the UE requires DL compressed mode in order to perform measurements on 10 MHz OFDM |
| >15 MHz | MP | | Boolean | TRUE means that the UE requires DL compressed mode in order to perform measurements on 15 MHz OFDM |
| >20 MHz | MP | | Boolean | TRUE means that the UE requires DL compressed mode in order to perform measurements on 20 MHz OFDM |
| Need for uplink compressed mode | | | | |
| FDD measurements | MP | | Boolean | TRUE means that the UE requires UL compressed mode in order to perform measurements on FDD |
| 3.84 Mcps TDD measurements | CV-3.84_Mcps_tdd_sup | | Boolean | TRUE means that the UE requires UL compressed mode in order to perform measurements on 3.84 Mcps TDD |
| 1.28 Mcps TDD measurements | CV-1.28_Mcps_tdd_sup | | Boolean | TRUE means that the UE requires DL compressed mode in order to perform measurements on 1.28 Mcps TDD |
| GSM measurements | CV-gsm_sup | | | |
| >GSM 900 | MP | | Boolean | TRUE means that the UE requires UL compressed mode in order to perform measurements on GSM 900 |

TABLE 5-continued

| Information Element/Group name | Need | Multi | Type and reference | Semantics description |
|---|---|---|---|---|
| >DCS 1800 | MP | | Boolean | TRUE means that the UE requires UL compressed mode in order to perform measurements on DCS 1800 |
| >GSM 1900 | MP | | Boolean | TRUE means that the UE requires UL compressed mode in order to perform measurements on GSM 1900 |
| Multi-carrier measurement | CV-mc_sup | | Boolean | TRUE means that the UE requires UL compressed mode in order to perform measurements on multi-carrier |
| OFDM E-UTRAN measurements | | | | |
| >1.25 MHz | MP | | Boolean | TRUE means that the UE requires UL compressed mode in order to perform measurements on 1.25 MHz OFDM |
| >2.5 MHz | MP | | Boolean | TRUE means that the UE requires UL compressed mode in order to perform measurements on 2.5 MHz OFDM |
| >5 MHz | MP | | Boolean | TRUE means that the UE requires UL compressed mode in order to perform measurements on 5 MHz OFDM |
| >10 MHz | MP | | Boolean | TRUE means that the UE requires UL compressed mode in order to perform measurements on 10 MHz OFDM |
| >15 MHz | MP | | Boolean | TRUE means that the UE requires UL compressed mode in order to perform measurements on 15 MHz OFDM |
| >20 MHz | MP | | Boolean | TRUE means that the UE requires UL compressed mode in order to perform measurements on 20 MHz OFDM |

TABLE 6

| Information Element/Group name | Need | Multi | Type and reference | Semantics description |
|---|---|---|---|---|
| FDD measurements | MP | 1 to <maxFreqBandsFDD> | | |
| >FDD Frequency band | MD | | Enumerated (Band I, Band II, Band III, Band VI, Band IV, Band V) | The default value is the same as indicated in the IE "Frequency band" included in the IE "UE radio access capability extension". One spare value is needed The default value is the same as R99, if the IE "FDD Frequency band 2" below is not included. The default value is the same as the IE "FDD Frequency band 2", if the IE "FDD Frequency band 2" is included. |
| >FDD Frequency band 2 | MD | | Enumerated (Extension Indicator) | The default value is the same as indicated in the IE "Frequency band 2" included in the IE "UE radio access capability extension"., if the IE "FDD Frequency band" above is not included. The default value is the same as the IE "FDD Frequency band", if the IE "FDD Frequency band" is included. Fifteen spare values are needed |
| >Need for DL compressed mode | MP | | Boolean | TRUE means that the UE requires DL compressed mode in order to perform measurements on the FDD frequency band indicated by the IE "FDD Frequency band" |
| >Need for UL compressed mode | MP | | Boolean | TRUE means that the UE requires UL compressed mode in order to perform measurements on the FDD frequency band indicated by the IE "FDD Frequency band" |

TABLE 6-continued

| Information Element/Group name | Need | Multi | Type and reference | Semantics description |
|---|---|---|---|---|
| TDD measurements | CV-tdd_sup | 1 to <maxFreqBandsTDD> | | |
| >TDD Frequency band | MP | | Enumerated (a, b, c) | |
| >Need for DL compressed mode | MP | | Boolean | TRUE means that the UE requires DL compressed mode in order to perform measurements on TDD frequency band indicated by the IE "TDD Frequency band" |
| >Need for UL compressed mode | MP | | Boolean | TRUE means that the UE requires UL compressed mode in order to perform measurements on TDD frequency band indicated by the IE "TDD Frequency band" |
| GSM measurements | CV-gsm_sup | 1 to <maxFreqBandsGSM> | | |
| >GSM Frequency band | MP | | Enumerated (GSM450, GSM480, GSM850, GSM900P, GSM900E, GSM1800, GSM1900) | Nine spare values are needed. |
| >Need for DL compressed mode | MP | | Boolean | TRUE means that the UE requires DL compressed mode in order to perform measurements on GSM frequency band indicated by the IE "GSM Frequency band" |
| >Need for UL compressed mode | MP | | Boolean | TRUE means that the UE requires UL compressed mode in order to perform measurements on GSM frequency band indicated by the IE "GSM Frequency band" |
| Multi-carrier measurement | CV-mc_sup | | | |
| >Need for DL compressed mode | MP | | Boolean | TRUE means that the UE requires DL compressed mode in order to perform measurements on multi-carrier |
| >Need for UL compressed mode | MP | | Boolean | TRUE means that the UE requires UL compressed mode in order to perform measurements on multi-carrier |
| OFDM E-UTRAN measurements | | | | |
| >1.25 MHz band | MP | | Enumerated (x, y, z) | |
| >Need for DL compressed mode | MP | | Boolean | TRUE means that the UE requires DL compressed mode in order to perform measurements on 1.25 MHz OFDM |
| >Need for UL compressed mode | MP | | Boolean | TRUE means that the UE requires UL compressed mode in order to perform measurements on 1.25 MHz OFDM |
| >>2.5 MHz band | MP | | Enumerated (x, y, z) | |
| >Need for DL compressed mode | MP | | Boolean | TRUE means that the UE requires DL compressed mode in order to perform measurements 2.5 MHz OFDM |
| >Need for UL compressed mode | MP | | Boolean | TRUE means that the UE requires UL compressed mode in order to perform measurements on 2.5 MHz OFDM |
| >>5 MHz band | MP | | Enumerated (x, y, z) | |
| >Need for DL compressed mode | MP | | Boolean | TRUE means that the UE requires DL compressed mode in order to perform measurements 2.5 MHz OFDM |
| >Need for UL compressed mode | MP | | Boolean | TRUE means that the UE requires UL compressed mode in order to perform measurements on 5 MHz OFDM |
| >>10 MHz band | MP | | Enumerated (x, y, z) | |
| >Need for DL compressed mode | MP | | Boolean | TRUE means that the UE requires DL compressed mode in order to perform measurements 10 MHz OFDM |

TABLE 6-continued

| Information Element/Group name | Need | Multi | Type and reference | Semantics description |
|---|---|---|---|---|
| >Need for UL compressed mode | MP | | Boolean | TRUE means that the UE requires UL compressed mode in order to perform measurements on 10 MHz OFDM |
| >>15 MHz band | MP | | Enumerated (x, y, z) | |
| >Need for DL compressed mode | MP | | Boolean | TRUE means that the UE requires DL compressed mode in order to perform measurements 15 MHz OFDM |
| >Need for UL compressed mode | MP | | Boolean | TRUE means that the UE requires UL compressed mode in order to perform measurements on 15 MHz OFDM |
| >>20 MHz band | MP | | Enumerated (x, y, z) | |
| >Need for DL compressed mode | MP | | Boolean | TRUE means that the UE requires DL compressed mode in order to perform measurements 20 MHz OFDM |
| >Need for UL compressed mode | MP | | Boolean | TRUE means that the UE requires UL compressed mode in order to perform measurements on 20 MHz OFDM |

Referring again to FIG. 3, the WTRU 352 receives the measurement capabilities message. The WTRU 352 then performs measurements on the E-UTRAN signals 315 on E-UTRAN channels indicated in the measurement capabilities message and reports measurement results to the UTRAN 354 (step 314). The UTRAN 354 may initiate a handoff to the E-UTRAN 356 based on the measurement reports.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A method for use in a wireless transmit/receive unit (WTRU), the method comprising:
   receiving a first message from a universal mobile telecommunication systems (UMTS) terrestrial radio access network (UTRAN) base station via a first UTRAN channel;
   extracting a first information element (IE) associated with an Evolved-UTRAN (E-UTRAN) from the first message;
   generating a second message indicating E-UTRAN capability information, wherein the E-UTRAN capability information includes an indication of support for an orthogonal frequency division multiplex (OFDM) mode and support for UTRAN to E-UTRAN handover;
   transmitting the second message to the UTRAN base station via a second UTRAN channel; and
   receiving an E-UTRAN service based on the second message.

2. The method of claim 1, wherein the second message indicates a supported E-UTRAN frequency band.

3. The method of claim 1, wherein the second message is one of a multi-mode/multi-Radio Access Technology (RAT) capability message, a radio access capability message, or a radio access capability extension message.

4. A wireless transmit/receive unit (WTRU), comprising:
   a receiver configured to receive a first message from a universal mobile telecommunication systems (UMTS) terrestrial radio access network (UTRAN) base station via a first UTRAN channel;
   a processor configured to extract a first information element (IE) associated with an Evolved-UTRAN (E-UTRAN) from the first message; and to generate a second message indicating E-UTRAN capability information, wherein the capability information includes an indication of support for an orthogonal frequency division multiplex (OFDM) mode and support for UTRAN to E-UTRAN handover;
   a transmitter configured to transmit the second message to the UTRAN base station via a second UTRAN channel; and
   the receiver configured to receive an E-UTRAN service based on the second message.

5. The WTRU of claim 4, wherein the processor is configured to indicate a supported E-UTRAN frequency band in the second message.

6. The WTRU of claim 4, wherein the second message is one of a multi-mode/multi-RAT capability message, a radio access capability message, or a radio access capability extension message.

* * * * *

UNITED STATES PATENT AND TRADEMARK OFFICE
CERTIFICATE OF CORRECTION

PATENT NO. : 8,295,246 B2
APPLICATION NO. : 13/301114
DATED : October 23, 2012
INVENTOR(S) : Kamel M. Shaheen Page 1 of 1

It is certified that error appears in the above-identified patent and that said Letters Patent is hereby corrected as shown below:

IN THE SPECIFICATION

At column 1, lines 64-65, after "may support multiple", delete "mode of operations" and insert therefore --modes of operation--.

At column 4, line 17, after "of a process", insert --300--.

At column 5, lines 45-46, after "may have different", delete "bandwidth" and insert therefore --bandwidths--.

At column 9, line 6, after "frequency", delete "bands" and insert therefore --band--.

Signed and Sealed this
Twenty-third Day of April, 2013

Teresa Stanek Rea
*Acting Director of the United States Patent and Trademark Office*